United States Patent [19]

Logsdon

[11] 4,400,920
[45] Aug. 30, 1983

[54] APPARATUS FOR SECURING PIPE

[76] Inventor: Duane D. Logsdon, P.O. Box 186, Stanton, Calif. 90680

[21] Appl. No.: 254,924

[22] Filed: Apr. 16, 1981

[51] Int. Cl.³ .............................................. E04B 5/48
[52] U.S. Cl. .................................. 52/221; 52/126.1; 248/56
[58] Field of Search .................... 52/221, 126.1, 126.3, 52/126.5; 254/104; 285/194, 217, 421; 248/56, 27.1, 57; 403/240, 243, 369, 409, 374, 371, 314

[56] References Cited

U.S. PATENT DOCUMENTS

| | | | |
|---|---|---|---|
| 246,846 | 9/1881 | Wilde | 403/243 X |
| 1,749,135 | 3/1930 | Harter | 248/56 |
| 2,709,571 | 5/1955 | Mafera | 254/104 |
| 3,572,770 | 3/1971 | Kagi | 285/421 X |
| 4,135,335 | 1/1979 | Jensen | 254/140 X |
| 4,262,409 | 4/1981 | Madej | 248/56 X |
| 4,264,046 | 4/1981 | Nattel et al. | 248/56 |

*Primary Examiner*—Friedman Carl D.
*Attorney, Agent, or Firm*—K. H. Boswell; Edward D. O'Brian

[57] ABSTRACT

In high-rise and mid-rise buildings wherein a concrete slab serves as a floor for one level and a ceiling for the level below it, it is necessary to secure vertical plumbing pipes to the slab wherein the plumbing pipes penetrate the slab through holes passing between the levels. An apparatus for securing these pipes includes a first and second member. Each of the members includes a base having a first and second end. Each of the members include one or more ribs attaching perpendicular to the base and extending between the ends of the base. The ribs on each of the members taper from the first end toward the second end of the base such that in side view each of the members is wedge shape in cross-section. The first member is located in the hole in the slab adjacent to the pipe by inserting from the top and the second member is located by so inserting through the bottom. This orients the members such that the large ends of their tapers are distal from each other. The pipe is fixed to the hole by moving the members toward one another such that each slides upon the taper of the other, respectively. This spreads the base of the first and second members such that one impinges against the side of the hole and the other impinges against the pipe. The members are fixed with respect to each other by suitable solvent welding techniques or the like to fixly maintain the pipe in its location within the hole in the slab.

11 Claims, 8 Drawing Figures

U.S. Patent   Aug. 30, 1983   Sheet 1 of 2   4,400,920
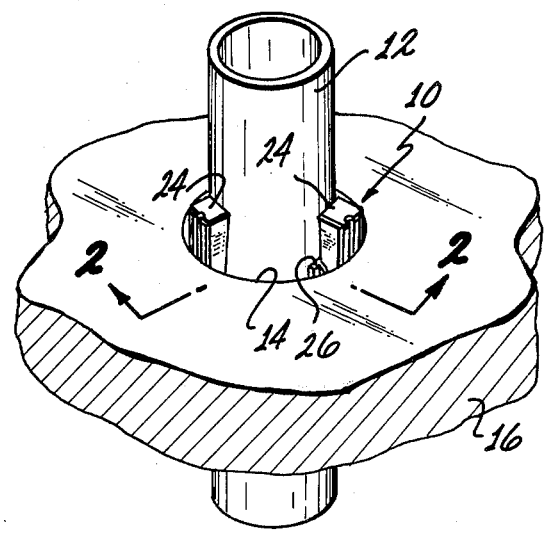
FIG. 1
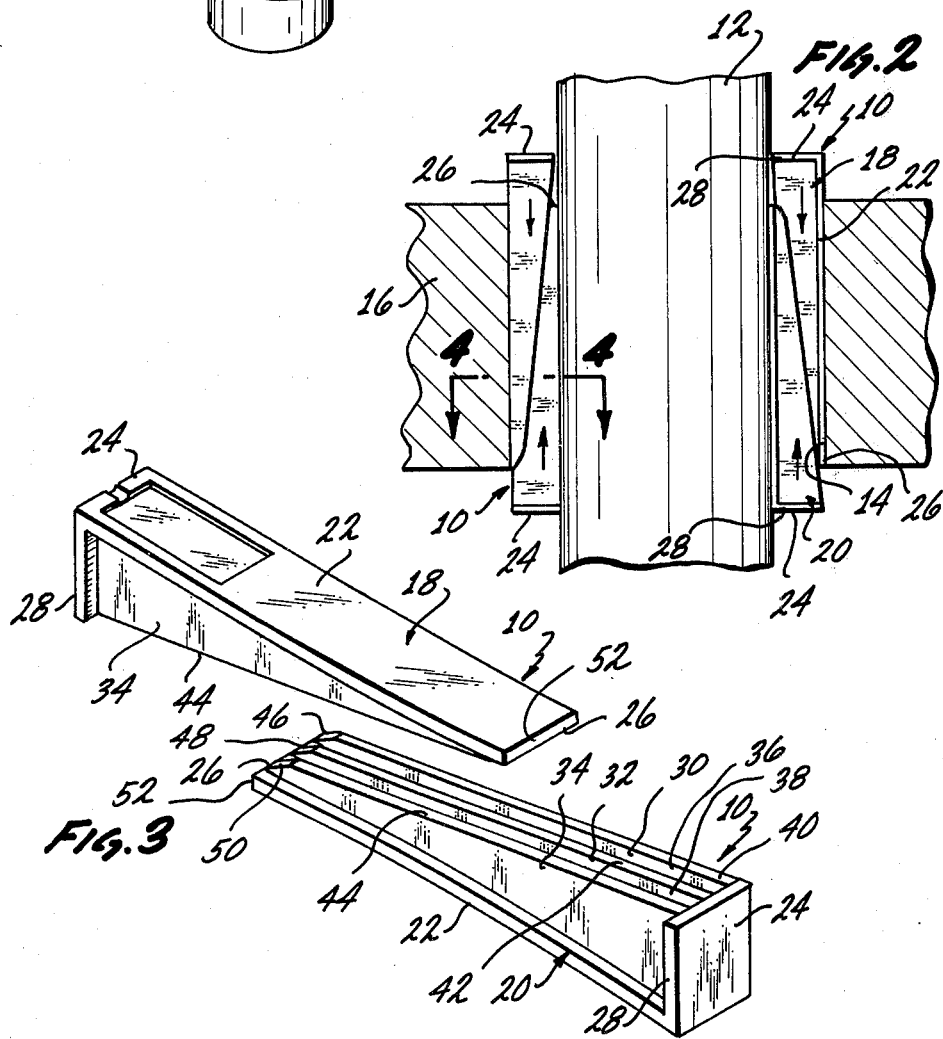
FIG. 2
FIG. 3

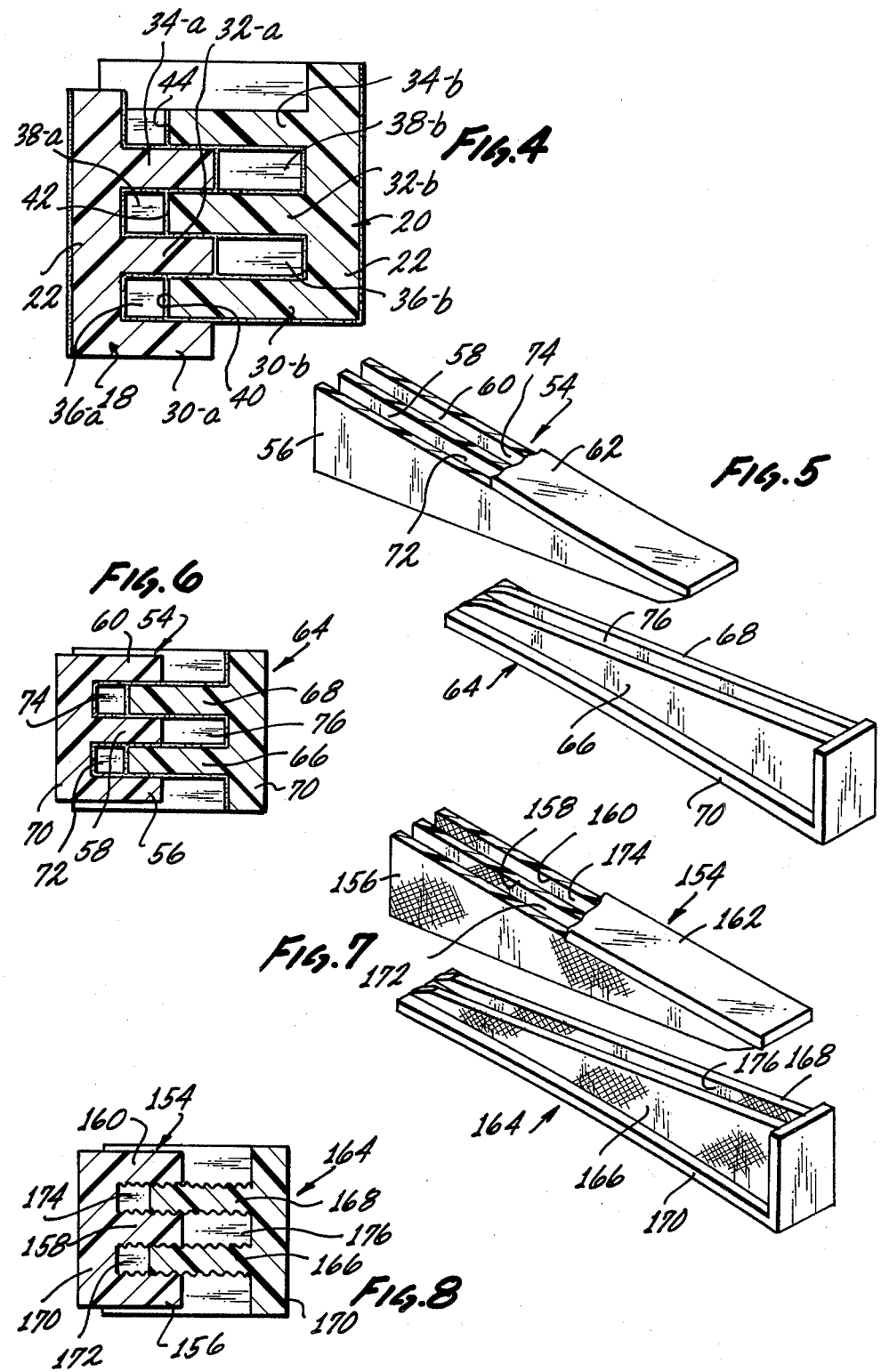

APPARATUS FOR SECURING PIPE

BACKGROUND OF THE INVENTION

This invention is directed to an apparatus for securing a pipe to a structural element wherein the pipe penetrates through the element by passing through a hole in the element. The apparatus includes a first and second wedge shaped member each having at least one rib attaching to the base. The members are located in the hole and the members are moved with respect to one another such that the bases can be spread apart from one another. When one member is firmly lodged against the side of the hole and the other member firmly lodged against the pipe the ribs are suitably joined to one another in a permanent manner fixing the pipe in the hole.

Modern construction techniques make use of concrete slabs or layers which can serve as floor for one layer and a ceiling for the layer below it in multistory structures. In pouring of the slabs appropriate voids can be included in the slabs for passage of suitable utility conduits through the structure. Alternately after the slab is formed the concrete can be cored to provide suitable holes for passage of the necessary utility conduits. In any event, however, the slabs are formed and provided with suitable holes through which the utility conduits for the structure flow in a vertical manner.

With the expansion of plastic technology, metallic pipes used for plumbing are systematically being replaced. Plastic hot and cold inlet pipes are now commonly found in place of the prior used galvanized pipes or copper tubing. Recently building codes have been modified to allow the use of large diameter PVC and other plastic pipe for drainage risers in place of heavier iron or clay pipes. These drainage risers hereinafter simply referred to as pipes, travel vertically through the structure and must pass through the utility cut outs in the individual cement slabs forming the partitions between floors and ceilings. Appropriate expansion couplings must be used along the length of these pipes to accommodate for thermal expansion and contraction. Because of the presence of such expansion couplings and because of the necessity of systematically supporting the weight of the pipe along its total vertical dimension it is necessary to appropriately fasten the pipe to each of the individual cement slabs.

In fastening the above noted pipes along their vertical length, of course, boring into the pipe and perforating its interior is precluded. Any attaching methods for holding the pipe to the individual slabs must simply engage only the outside of the pipe and not penetrate into its interior. Flanges or the like could be utilized to clamp around the pipe and then rest on the flooring side or top edge of each slab. This, however, is disadvantageous in that the portion of the flange resting on the upper surface of the slab must be accounted for and therefore the presence of such flanges require increases in the dimension of appropriate wall sections wherein a flange might be located therein or build up of the floor area above the flange in order to hide or mask it.

In view of the above it is evident that there exists a need for a method for attaching vertical running large diameter piping to the individual cement slabs in highrise or medium-rise structures. Preferredly such attaching must not extend beyond the perimeter of the hole passing through the cement slab but should be incorporated totally within the hole. Of course, any means for attaching pipes must consider the economics of both manufacture of the attaching device as well as the labor costs in installing it. The cost savings of utilizing plastic pipe for drainage risers would be totally negated if in fact the cost to secure these risers to each individual level became a significant portion of the costs of the pipes.

BRIEF DESCRIPTION OF THE INVENTION

In view of the above it is a broad object of this invention to provide an apparatus for securing vertical rising pipes to a structure element such as a floor, wall or ceiling wherein the pipe penetrates through the elements through a hole in the elements. It is a further object to provide such an apparatus which is easily and conveniently used by the installers of the same yet once installed will fixly and securely hold the pipe to the elements. It is an additional object to provide a device that is both economical to manufacture and to install and thus increase the economic advantage of using plastic pipes over that of other materials.

These and other objects as will become evident from the remainder of this specification are achieved in an apparatus for securing a pipe to a structural wall, floor or ceiling element wherein said pipe penetrates through said element by passing through a hole in said element which comprises: a first member and a second member; each of said members including a base having a first end and a second end; each of said members having at least one rib attaching essentially perpendicular to said base of said member and extending between the ends of said base, said ribs on each of said members tapering from said first end to said second end of the base to which it is attached such that in side view each of said members is wedge shaped; said first and said second members locatable in said hole next to said pipe such that said first end of said first member is oriented toward said second end of said second member and said second end of said first member is oriented toward said first end of said second member positioning said second end of each of said member against the rib of the other of said members and a portion of each of said ribs of said first and second members in a side by side relationship so as when said first ends of each of said members are brought closer together said bases of said first and said second member are extended away from each other one impinging against said pipe and the other impinging against the walls of said hole.

Preferredly each of the members would have two or more ribs spaced apart from each other such that a void existed between each two adjacent ribs. The ribs would be located in essentially parallel relationship such that the voids were also parallel with the ribs. When one of the members was fitted onto the other of the members a portion of the ribs of one of the members would fit into the voids of the other of the members and visa versa. The presence of two or more ribs provides for increased surface area for solvent welding of the first member to the second member and thus increases the strength and load carrying ability of the weld between the members.

In one embodiment of the invention the members would be identical each having the same number of ribs and voids and would not require the production of two separate components or a necessity of having two separate components when installing the same. In a second embodiment the members would not be identical but would be individually formed. As so formed in this second embodiment one of the members could have one more rib than the other of the members such that the member with the lesser number of ribs would have its ribs sandwiched in between the ribs of the member with the greater number of ribs.

The surface of the ribs could be formed as smooth surfaces which would be appropriately joined together by suitable solvent welding techniques or they could be formed as convoluted surfaces increasing their surface area per unit volume. The use of convoluted surfaces would allow for certain amount of frictional engagement between the ribs of one member with the ribs of the other member and also allow for a greater surface area for solvent adhasion when the two members were solvent welded together.

BRIEF DESCRIPTION OF THE DRAWINGS

The invention described in this specification will be more fully understood when taken in conjunction with the drawings wherein:

FIG. 1 is an oblique view of the invention as used in holding a pipe within the interior of a hole through which the pipe penetrates a structural element;

FIG. 2 is an elevational view in partial section taken about the line 2—2 of FIG. 1;

FIG. 3 is an oblique view of the individual components of the invention and showing the components exploded away one from the other from the position shown in FIGS. 1 and 2;

FIG. 4 is a plan view in section about the line 4—4 of FIG. 2;

FIG. 5 is an oblique view of an embodiment of the invention and shown in a manner as is the embodiment shown in FIG. 3;

FIG. 6 is a plan view in section of the embodiment of FIG. 5 showing how the individual components of the embodiment fit together;

FIG. 7 is an oblique view of a further embodiment of the invention and shown in the manner of FIG. 3;

FIG. 8 is a plan view in section showing how the components of FIG. 7 fit together.

The invention described in this specification and illustrated in the drawings utilizes certain principles and/or concepts as are set forth and claimed in the claims apended to this specification. Those skilled in the plumbing arts to which this invention pertains will readily realize and appreciate that these concepts and/or principles could be applied to a number of differently appearing or differently describable embodiments differing from the explicite illustrative embodiment described herein. For this reason this invention is not to be construed as being limited to the exact embodiment shown for illustrative purposes but is only to be construed in light of the apended claims.

DETAILED DESCRIPTION OF THE INVENTION

In FIGS. 1, 2 and 3 a first embodiment of the invention is shown. Referring to FIGS. 1 and 2 the apparatus 10 of the invention is shown fixedly holding a pipe 12 in place within a hole 14 formed in a structural element 16. The structural element 16 represents a layer serving as a combination floor for one level and ceiling for the level below it as is found in a typical high-rise building. Normally such a layer, element or slab would be formed of poured concrete incorporating sufficient structural steel therein to meet strength requirements etc. The hole 14 is formed in the element either by locating a cylindrical object in place prior to pouring of the concrete or by boring of an appropriate cylindrical element out of the concrete with a typical concrete saw or the like. In any event, hole 14 is formed within the element 16 and serves as the utility access between the individual floors of the building or the like.

Normally the pipe 12 would be a large diameter PVC pipe such as 4" or 6" pipe. This large diameter pipe would serve as the drainage riser for the building or the like wherein the pipe was located. It is necessary to render the pipe immobile with regard to the structural element 16 for several reasons. The first of these would be to provide vertical support of the pipe along the length it must travel. Considerable weight and force can be generated along a long section of pipe of a multistory building. The second requirement would be to isolate the pipe within the hole 14 such that it is not subject to horizontal or lateral movement. This would insure that the pipe does not vibrate within the hole 14 causing the emission of audible sound waves which would be disturbing to the occupants of the building or causing frictional rubbing of the pipe against the edges of the hole 14 abrading the surface of the pipe 12.

The apparatus 10 successfully positions the pipe within the hole 14 and prevents both vertical and horizontal movement of the pipe 12 within the hole 14. This securely holds the pipe 12 to the structural element 16 and prevents horizontal movement which would be both detrimental to the pipe itself and the source of environmental noise polution.

In FIGS. 2 and 3 it can be seen that the apparatus 10 consists of a first member 18 and a second member 20. Two such apparatuses 10 are shown in FIG. 2 one holding the left side of the pipe and one holding the right side of the pipe. However, as seen in FIG. 1 the line 2—2 of FIG. 1 is not a straight line but is in fact a bent line. Preferredly three or four of the apparatuses 10 would be utilized to isolate the pipe 12 within the hole 14. For economy of both purchase of the apparatus and installation of the apparatus three such apparatuses 10 would be sufficient to fixly secure pipe 12 within the structural element 16.

In FIG. 3 first member 18 and second member 20 are shown as independent and distinct articles. They are, infact, identical and are only rotated with respect to one another. If the right hand edge of member 18 in FIG. 3 were rotated counterclockwise 180° it would produce second member 20. In describing the respective parts of the first and second members 18 and 20, since they are identical, identical numbers will be used for identical respective parts. Thus the same numbers will be used in reference to part of both members 18 and 20. Identification of parts might be made on one or the other of members 18 or 20 depending which of these particular members the individual components are best seen in.

A base 22 forms the backbone structure of the members 18 and 20. The base 22 is essentially a rectangular plate. The base 22 extends from first end 24 longitudinally to second end 26. An end piece 28 is located at first end 24 and extends perpendicular to the base 22. Extending between the end piece 28 on first end 24 toward and tapering down to second end 26 are ribs 30, 32 and 34. Located between ribs 30 and 32 is void 36. Located between ribs 32 and 34 is void 38. The ribs 30, 32 and 34 are spaced away from one another and are placed in parallel planes. The spacing between each of the ribs is such that the voids 36 and 38 are slightly wider than each of the ribs 30, 32 and 34. This allows the ribs of member 18 to appropriately fit into the voids of member 20 and conversely the ribs of member 20 to fit into the voids of member 18.

The upper surface 40 of rib 30, the upper surface 42 of rib 32 and the upper surface 44 of rib 34 all lie on a plane which tapers toward the plane of the base 22. This taper is smooth throughout most of the length of the ribs 30, 32 and 34 except at a point near end 26. At this end the upper surface 46 of rib 30, the upper surface 48 of rib 32 and the upper surface 50 of rib 34 tapers more sharply toward end 26. The angle produced between the surfaces 46, 48 and 50 and the base 22 is therefore greater than the angle produced between the surfaces 40, 42 and 44.

Referring now to FIG. 2 it can be seen that members 18 and 20 can be brought together such that end 26 of member 18 is oriented toward end 24 of member 20 and likewise end 26 of member 20 is oriented toward end 24 of member 18. When this happens the two members 18 and 20 can be brought together such that the second ends 26 of each of the respective members 18 and 20 are positioned adjacent to the upper surfaces 40, 42 and 44 of the ribs 30, 32 and 34 on the other of the members. Because the upper surfaces 46, 48 and 50 near ends 26 of members 18 and 20 makes a larger angle with base 22 than is the remainder of these upper surfaces 40, 42 and 44 of the respective ribs 30, 32 and 34, a certain portion of each of the ribs 30, 32 and 34 engages into the voids 36 and 38 of the opposite member 18 or 20 respectively. The amount of each of the ribs 30, 32 and 34 which would become located within the voids 36 and 38 is dependent on the angle of the upper surfaces 46, 48 and 50 with the base 22. By enlarging this angle a greater amount of each of the ribs can penetrate into the voids of the opposite member. By decreasing this angle a lesser amount of each of the ribs would fit into the voids on the other member. Normally about ⅛ to ¼ inch of the ribs will fit into the opposite voids when the overall length of the members 18 and 20 is about 6 inches.

Edge 52 on end 26 of both members 18 and 20 is a straight edge. When the members 18 and 20 are brought together this edge 52 abutts against the upper surfaces 40, 42 and 44 of the ribs. The members 18 and 20 can be moved longitudinally with respect to one another by sliding this edge 52 along the upper surfaces 40, 42 and 44 of the ribs 30, 32 and 34. When this happens because of the general overall wedge shape of the members 18 and 20 the respective bases 22 of these two members 18 and 20 will be positioned parallel to one another and will move away from and toward each other while still maintaining their parallel relationship. In this manner the spacing between the two bases of the two members 18 and 20 can be increased or decreased by sliding the members 18 and 20 with respect to one another. When the first ends 24 of each of the members 18 and 20 are slid away from each other the respective bases 22 come closer together and when these first ends 24 of the respective members 18 and 20 are brought closer toward one another the respective bases 22 separate from each other. The pipe 12 can therefore be securely impinged within the hole 14 by bringing the ends 24 of the members 18 and 20 toward each other, spreading the bases 22 of each of these members away from each other until one of the bases contacts the surface of the wall 14 and the other of the bases contacts the surface of the pipe 12.

In using the apparatus 10 one of the members 18 or 20 is positioned within the hole 14 and the other of the members 18 or 20 is appropriately coated with solvent or glue along its ribs 30, 32 and 34 and slid into place engaging the other member. The two ends 24 of the two members are brought together until the surfaces 22 of the respective members are one against the side of the hole 14 and one against the pipe 12. This is done in a very easily and convenient manner and in a few moments the solvent or glue will be sufficiently tacky to hold the two members in a fixed relationship with one another. After appropriate setting time of the solvent or glue the members 18 and 20 become fused with one another and can no longer be moved. Additionally the member 18 or 20 (the member 20 as seen in FIG. 2) which is adjacent to the pipe 12 can be solvent welded to the outside surface of the pipe 12. Since the preferred material of construction of the members 18 and 20 is PVC plastic, the same material as the pipes 12, this solvent welding of one of the members to the pipe is easily and conveniently done.

As noted above because of the increase in the angle with which surfaces 46, 48 and 50 make with the base 22 compared to the surfaces 40, 42 and 44 a portion of each of the ribs of one member will fit into the voids of the other member. If in fact the upper surfaces of the ribs 30, 32 and 34 tapered in a continuous straight line right down to edge 52 of the members then no portion of the ribs of one of the members could extend into the void of the other of the members. Alternately instead of having the surfaces 46, 48 and 50 taper at a greater degree than the remainder of the surfaces of the ribs 30, 32 and 34, end 26 of each of the members 18 or 20 could contain appropriate extensions of the voids 36 and 38 through the surface of the base 22 such that notches are provided along the edge 5. This is not preferred, however, because the preferred method of manufacture of the members 18 and 20 is by injection molding of a suitable plastic material. To form such indentations in the end 26 would require location of a positive area in the mold wherein the indentations are formed. Since this would complicate the mold it is preferable to form the members 18 and 20 as illustrated. Preferredly then by incorporating two different angles of intersection of the upper surfaces of the ribs 30, 32 and 34 with the base 22 the appropriate amount of extension of the ribs into the voids is achieved.

Referring now to FIG. 4 the members 18 and 20 are seen in a sectional view about the line 4—4 of FIG. 2 showing how the two members 18 and 20 engage with one another. In FIG. 4 the ribs of member 18 are identified by their appropriate number followed by the letter a. Likewise the ribs of member 20 are identified by their appropriate number followed by the letter b. The same numbering scheme is used to differentiate the voids between members 18 and 20. It can be seen in FIG. 4 that a portion of rib 30b of member 20 fits into void 36a of member 18. Likewise a portion of rib 32b fits into void 38a of member 18. A portion of rib 32a of member 18 fits into void 36b of member 20 and a portion of rib 34a fits into void 38b.

Rib 30a of member 18 and rib 34b of member 20 do not fit into any corresponding voids, however, they do lie adjacent to ribs on the other member. Both of the side surfaces of ribs 30b, 34b, 32a and 34a can be solvent welded to the corresponding side surfaces of their adjacent rib. One of the side surfaces of ribs 34a and 34b can be appropriately solvent welded to the other ribs. Thus in attaching members 18 and 20 to each other solvent welding of five side surfaces of the ribs can be utilized to engage the two members together. This sufficiently increases the surface area contact between the two members 18 and 20 over that which would be achieved by simply abutting one smooth wedge against the surface of a second smooth wedge. It can also easily be seen in FIG. 4 that the middle rib 34 of both members 18 and 20 can always be engaged into a void in the opposite member, however, which of the remaining ribs 30 or 34 is engaged in a void with the opposite member depends on how the two members 18 and 20 are brought together such that rib 34b becomes located in void 38a and all the other ribs and voids correspondently shifted. If so shifted, however, the same number of solvent weldable surfaces would still be maintained.

For the embodiment shown in FIGS. 1 through 4 the members 18 and 20 are formed to be identical with each other. This simplified production in that only one member need be formed and two units of this one member used to form the apparatus 10.

In FIGS. 5 and 6 a different embodiment of the invention is described. In FIGS. 5 and 6 two nonuniform members are described. Member 54 contains three ribs 56, 58 and 60. These are appropriately attached to a base 62. Member 64 contains two ribs 66 and 68 which are appropriately attached to a base 70. All of the ribs 56, 58, 60, 66 and 68 shown in FIGS. 5 and 6 contain the two angles with respect to the bases 62 and 70 as previously described. This allows for a portion of these ribs to extend into corresponding voids on the opposite member as previously described.

Member 54 contains two voids 72 and 74 whereas member 64 contains one void 76. The ribs 66 and 68 of member 64 fit into voids 72 and 74 of member 54 and the rib 58 of member 54 fits into the void 76 of member 64. The remaining ribs 56 and 60 of member 54 sandwich the two ribs 66 and 68 of the second member 64 between them. Four solvent weldable connections between the ribs of the opposite members are therefore achievable. While the number of solvent weldable connections between the two members 54 and 64 has been reduced with respect to the number achievable with members 18 and 20, the overall width of the combined apparatus formed by members 54 and 64 is less than the overall width of the apparatus formed by members 18 and 20. In certain installations wherein the same hole 14 through a structural element 16 might be used for different utility conduits it may be advantageous to reduce the amount of space the apparatus 10 takes up in the hole. In such utilizations the embodiment of FIGS. 5 and 6 as well as the embodiment of FIGS. 7 and 8 noted below would be advantageously used.

In FIGS. 7 and 8 an embodiment similar to the embodiment in FIGS. 5 and 6 is described. For this reason the same numbering system used in FIGS. 5 and 6 will be used except that each of the components will be preceeded by the numeral 100. Thus, for example, in FIGS. 7 and 8 member 154 is analegous to member 54 of FIGS. 5 and 6, etc. The ribs 156, 158, 160, 166 and 168 of FIGS. 7 and 8 differ from the ribs described in FIGS. 5 and 6 in that their surfaces are not smooth as with the previous ribs but are convoluted. The convolution of these surfaces allows for frictional engagement of the appropriate ribs with one another as well as slightly increasing their surface area. The frictional engagement between the ribs allows for temporary maintenance of the members 154 and 164 with each other during placement and construction. The convolutions also produce a slight increase in surface area therefore a slight increase of the strength of the bond between the two when the members are finally fixed in place in use.

While primarily designed to hold vertical piping within holes in concrete structural elements it is of course evident that the apparatus 10 of this invention could be utilized to hold a variety of different types of piping in different appropriate openings in other structural elements.

I claim:

1. An apparatus for securing a pipe to a structural wall, floor or ceiling element wherein said pipe penetrates through said element by passing through a hole in said element which comprises:
    a first member and a second member;
    each of said members including a base having a first end and a second end;
    each of said members having at least one rib attaching essentially perpendicular to said base of said member and extending between the ends of said base, said ribs on each of said members tapering from said first end to said second end of the base to which it is attached such that in side view each of said members is wedge shaped;
    said first and said second members locatable in said hole next to said pipe such that said first end of said first member is oriented toward said second end of said second member and said second end of said first member is oriented toward said first end of said second member positioning said second end of each of said members against the rib of the other of said members and a portion of each of said ribs of said first and said second members interdigitized so as when said first ends of each of said members are brought closer together said bases of said first and said second member are extended away from each other one impinging against said pipe and the other impinging against the walls of said hole.

2. The apparatus of claim 1 wherein:
    at least said first of said members including at least two ribs spaced apart one from the other is an essentially parallel relationship formig a void between said two ribs on said first member, said rib on said second of said members fitting into said void.

3. The apparatus of claim 2 wherein:
    said second member includes at least 2 ribs spaced apart one from the other in an essentially parallel relationship forming a void between said ribs on said second member, one of said ribs on said first member fitting into said void between said ribs on said member and one of said ribs on said second member fitting into said void between said ribs on said first member.

4. The apparatus of claim 3 wherein:
    said first and said second members are identical with each other.

5. The apparatus of claim 3 wherein:
    each of said first and second members includes 3 ribs spaced apart from each other in an essentially parallel relationship forming a first void between the middle of said 3 ribs and one of the outside 2 of said 3 ribs and a second void between the middle of said 3 ribs and the other of said outside 2 of said 3 ribs.

6. The apparatus of claim 3 wherein:
    said first and said second members are nonidentical with each other.

7. The apparatus of claim 6 wherein:
    one of said first or said second members includes one more rib than the number of ribs on the other of said first or said second members.

8. The apparatus of claim 3 wherein:
each of said ribs includes a first surface and a second surface, said second surface interspaced between said first surface and said second end of said member on which said ribs are located, the angle formed between said second surface and said base being greater than the angle formed between said first surface and said base.

9. The apparatus of claim 8 wherein:
said first and said second members are identical with each other.

10. The apparatus of claim 9 wherein:
each of said first and second members includes 3 ribs spaced apart from each other in an essentially parallel relationship forming a first void between the middle of said 3 ribs and one of the outside 2 of said 3 ribs and a second void between the middle of said 3 ribs and the other of said outside 2 of said 3 ribs.

11. The apparatus of claim 8 wherein:
said first and said second members are nonidentical with each other.

* * * * *